United States Patent
Houivet et al.

(10) Patent No.: US 9,517,700 B2
(45) Date of Patent: Dec. 13, 2016

(54) METHOD FOR THE CONTACTLESS CHARGING OF THE BATTERY OF AN ELECTRIC AUTOMOBILE

(71) Applicant: RENAULT s.a.s., Boulogne Billancourt (FR)

(72) Inventors: Jeanne Houivet, Paris (FR); Samuel Cregut, Saint Remy les Chevreuses (FR)

(73) Assignee: RENAULT S.A.S., Boulogne Billancourt (FR)

( * ) Notice: Subject to any disclaimer, the term of this patent is extended or adjusted under 35 U.S.C. 154(b) by 261 days.

(21) Appl. No.: 14/362,498

(22) PCT Filed: Dec. 4, 2012

(86) PCT No.: PCT/EP2012/074342
§ 371 (c)(1),
(2) Date: Jun. 3, 2014

(87) PCT Pub. No.: WO2013/087451
PCT Pub. Date: Jun. 20, 2013

(65) Prior Publication Data
US 2014/0327397 A1    Nov. 6, 2014

(30) Foreign Application Priority Data

Dec. 13, 2011  (FR) .................... 11 61536

(51) Int. Cl.
*H02J 7/00* (2006.01)
*B60L 11/18* (2006.01)
(Continued)

(52) U.S. Cl.
CPC .......... *B60L 11/182* (2013.01); *B60L 11/1829* (2013.01); *B60L 11/1833* (2013.01);
(Continued)

(58) Field of Classification Search
CPC .......... H02J 5/005; H02J 7/0065; H02J 7/025; B60L 11/1809; B60L 11/1811; B60L 11/1816; B60L 11/182; B60L 11/1829
(Continued)

(56) References Cited

U.S. PATENT DOCUMENTS 5,654,621 A * 8/1997 Seelig ................... B60L 11/182
320/108
2011/0101791 A1   5/2011 Urano
(Continued)

FOREIGN PATENT DOCUMENTS

EP    0 700 574    7/1997
EP    2 317 624    5/2011

OTHER PUBLICATIONS

International Search Report Issued Jan. 4, 2013 in PCT/EP12/074342 Filed Dec. 4, 2012.
(Continued)

*Primary Examiner* — Paul Dinh
(74) *Attorney, Agent, or Firm* — Oblon, McClelland, Maier & Neustadt, L.L.P.

(57) ABSTRACT

A method for contactless charging of the battery of an electric automobile by magnetic induction using a transmitter coil of a charging device and a receiver coil of the vehicle, the method including: controlling a power supply of a converter, at terminals of which the transmitter coil is connected, according to a variable frequency; measuring, in an analog circuit, a value of a current and of a voltage at the terminals of the transmission coil; calculating a phase shift between the current and the voltage; converting the phase shift into a digital value; and locking the variable frequency of the converter to the phase-shift value by digital processing.

7 Claims, 5 Drawing Sheets

(51) Int. Cl.
    *H02J 7/02*       (2016.01)
    *H02J 5/00*       (2016.01)

(52) U.S. Cl.
    CPC .............. *H02J 5/005* (2013.01); *H02J 7/025* (2013.01); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
    USPC .................................. 320/107–109, 137–142
    See application file for complete search history.

(56) References Cited

U.S. PATENT DOCUMENTS

2011/0291606 A1    12/2011    Lee
2015/0091516 A1*    4/2015    Blum .................. B60L 11/1838
                                                   320/108

OTHER PUBLICATIONS

French Search Report Issued Sep. 7, 2012 in French Application No. 1161536 Filed Dec. 13, 2011.

* cited by examiner

METHOD FOR THE CONTACTLESS CHARGING OF THE BATTERY OF AN ELECTRIC AUTOMOBILE

BACKGROUND

The present invention relates to the contactless charging of a battery of an electric or hybrid automotive vehicle.

Charging is performed by magnetic induction: in a location called a "charging zone", a current is made to flow in a ground circuit possessing an emitting coil—or primary, thereby providing the power to a receiving coil—or secondary, of an electric or hybrid automotive vehicle, hereinafter simply referred to as a vehicle.

The phenomenon of magnetic induction takes place only if the primary and secondary coils are sufficiently close together, and the power transmitted depends in part on the resonance of the ground circuit. Although the vehicle is stationary when it is being charged, the frequency of the current flowing in the circuit must be adapted as a function of the position of the secondary with respect to the primary, therefore of the position of the vehicle in the charging zone with respect to the (stationary) primary. This is in order to achieve resonance of the system.

Hence more precisely, according to a first of its subjects the invention relates to a method of contactless charging of a battery of an electric automotive vehicle by magnetic induction between an emitting resonant circuit comprising an emitting coil of a charging device and a receiving resonant circuit of the vehicle comprising a receiving coil, the vehicle being positioned above the emitting coil, so as to be able to ensure good magnetic coupling between the emitting coil and the receiving coil, the method comprising steps consisting in:

commanding the electrical power supply together with the setpoints of an inverter across the terminals of which is linked the emitting coil according to a variable frequency, measuring in an analog circuit the value of the current and of the voltage across the terminals of the emitting coil, and computing the phase shift between the current and the voltage.

Such a method is known to the person skilled in the art, especially through the example given thereof in the prior art document EP2317624 which is aimed especially at comparing the phases between the voltage and the current so as to drive the excitation frequency, in a circuit which comprises a "phase comparator" module, on the basis of logical signals which are images of the sign of the current and of the voltage, so as to generate a signal whose variable amplitude causes a variation of the excitation frequency by a VCO module, that is to say a voltage controlled oscillator which generates a signal whose frequency depends on the input voltage.

Other solutions consist in causing the frequency of the charging circuit to vary as a function of the power received at the secondary; but in this case, the battery of the vehicle is liable to refuse too great a transfer of power.

However, such solutions are complex and expensive to implement.

BRIEF SUMMARY

The aim of the present invention is to remedy these drawbacks by proposing a simple and essentially digital solution.

With this objective in view, the method according to the invention, moreover in accordance with the preamble cited hereinabove, is essentially characterized in that it furthermore comprises steps consisting in:

converting the phase shift into a numerical value, and slaving by a digital processing the frequency of the switching setpoints dispatched to the inverter to the value of the phase shift.

By virtue of the invention, the detection of the phase difference between voltage and current is very simple at the hardware level, it minimizes the number of hardware electronic components, and therefore the cost of implementation, an essential part being done digitally. Preferably the phase shift value corresponds to the resonance of the system.

By virtue of these characteristics, the adjustment of performance in the digital part is easy and parametrizable.

By virtue of the invention, it is possible to seek resonance at much reduced transferred power, this being useful since a vehicle battery is liable to refuse too great a transfer of power.

In one embodiment, steps are envisaged consisting in establishing the absolute value of the phase shift, computing the derivative of the absolute value of the phase shift, computing the sign of the derivative, and estimating the value of the real phase shift as a function of the absolute value of the phase shift, of the derivative, and of its sign.

By virtue of this characteristic, it is possible by simple digital processing to know whether the frequency of the circuit is greater or less than the resonant frequency.

In one embodiment, a step is envisaged consisting in slaving the variable frequency to a phase shift value below a predetermined value.

This makes it possible to minimize the phase shift between the phase of the current and the phase of the voltage. This characteristic affords robustness of the system through the use of a closed loop on the phase.

By virtue of the invention, the frequency slaving is implemented by a software loop, thereby allowing complete flexibility of fine tuning of the slaving (frequency completely variable as a function of need).

Advantageously, the slaving is implemented by a proportional integral regulator the value of whose proportional gain and/or the value of whose integral gain are chosen so as to optimize the rate of convergence of the variable frequency to the predetermined value.

In one embodiment, at least one step of filtering the absolute value of the phase shift is envisaged.

In one embodiment, steps are envisaged consisting in comparing the derivative of the absolute value of the phase shift with a high threshold value, and with a low threshold value, emitting a signal representative of the sign of the signal of phase shift between the current and the voltage, in which if the derivative of the absolute value of the phase shift is greater than the high threshold value then the sign of the signal of phase shift between the current and the voltage is considered to be positive, and if the derivative of the absolute value of the phase shift is less than the low threshold value then the sign of the signal of phase shift between the current and the voltage is considered to be negative.

According to another of its subjects, the invention relates to a computer program, comprising program code instructions for the execution of the steps of the method according to the invention when said program is executed on a computer.

According to the invention, the formulation of the phase is constructed in part in analog, and in part in digital (by software); this makes it possible to reduce the number of analog components, therefore to reduce the cost and to increase the reliability of the system, whereas a purely analog solution is very complex to implement.

Finally, the invention also relates to a system for contactless charging by magnetic induction of a battery of an electric automotive vehicle, a receiving resonant circuit of which comprises a receiving coil, the system comprising:
an emitting resonant circuit comprising an emitting coil,
an inverter across the terminals of which is linked the emitting coil,
an analog and digital motherboard on which are disposed an analog circuit and a control board, the current and the voltage across the terminals of the emitting coil being measured and processed by the analog circuit which computes the absolute value (ABS_PH_ANA) of the phase shift between the current and the voltage, the phase shift signal (ABS_PH_ANA) arising from the analog circuit being injected as input into the digital control board which emits as output a frequency setpoint (N_PWM) to the inverter, and
an analog-digital converter for converting the phase shift into a numerical value,
the control board being configured so as to slave by a digital processing the frequency of the switching setpoints dispatched to the inverter to the value of the phase shift, so as to be able to ensure magnetic coupling between the emitting coil and the receiving coil when the vehicle is positioned above the emitting coil.

BRIEF DESCRIPTION OF THE DRAWINGS

Other characteristics and advantages of the present invention will be more clearly apparent on reading the following description given by way of illustrative and nonlimiting example and with reference to the appended figures in which.

DETAILED DESCRIPTION

Figure 1:
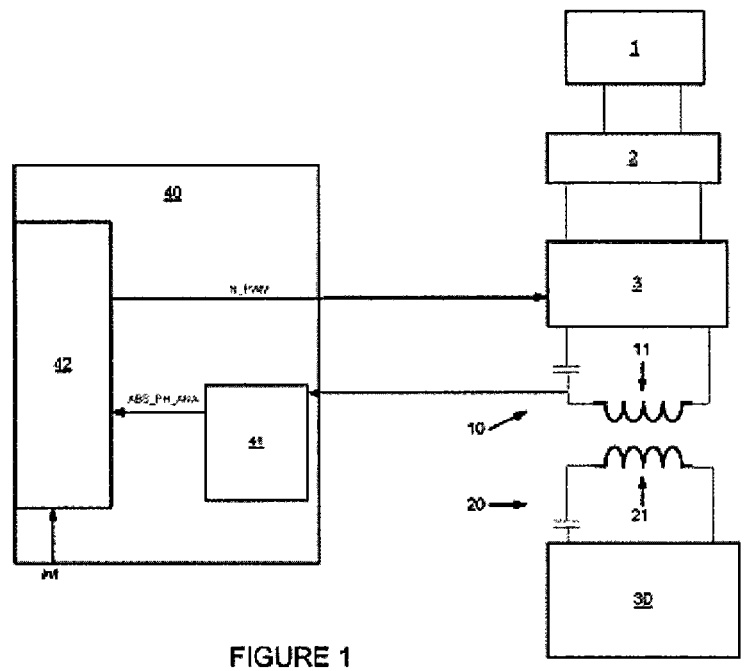
FIG. 1 illustrates an overall diagram of a contactless charging of a vehicle.
Figure 2:
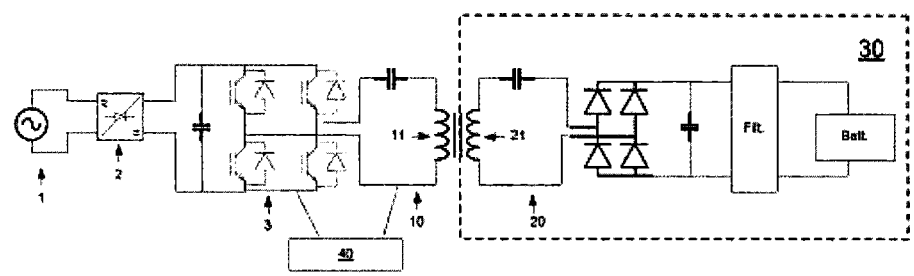
FIG. 2 illustrates certain electronic details of the diagram of FIG. 1.

FIG. 1 illustrates the general diagram of a contactless charging of a vehicle, and FIG. 2 illustrates certain electronic details of this general diagram, including a filter Filt.

An electrical source 1, typically an electrical network, emits a sinusoidal current to a rectifier 2. The rectifier 2 makes it possible to supply an inverter whose frequency is adjustable. The inverter 3 supplies a resonant charging circuit 10, termed an LC circuit, comprising a charging coil 11 also called the primary or emitting coil.

The primary 11 is able to charge the battery of a vehicle 30 equipped with a resonant receiving circuit 20, comprising a receiving coil 21 also called the secondary coil or simply the "secondary".

The charging circuit 10 and the receiving circuit are configured so as to resonate at the same resonant frequency.

Now, the resonant frequency depends on the relative position of the primary and the secondary.

To drive the value of the resonant frequency, it is proposed to take action only at the level of the charging, that is to say not at the level of the geographical position of the vehicle. Accordingly, action is taken at the level of the inverter 3 whose frequency is driven by a regulator.

The current U and the voltage I across the terminals of the primary 11 are measured and processed by an analog circuit 41 which computes the absolute value ABS_PH_ANA of the phase shift between the current and the voltage, hereinafter referred to as the phase shift signal or "phase shift".

The phase shift signal ABS_PH_ANA arising from the analog circuit 41 is injected as input into a digital control board 42 which emits as output a frequency setpoint which is an image of N_PWM to the inverter 3.

In this instance, the analog circuit 41 and the control board 42 are disposed on an analog and digital motherboard 40.

In a resonant circuit, the voltage and the current are in phase at resonance. The aim here is to perform a transfer of power between the primary 11 and the secondary 21 at resonance.

FIG. 2 presents more precisely the various power stages, and FIG. 1 represents in detail especially the motherboard or block 40 which corresponds to the control.

Figure 6:
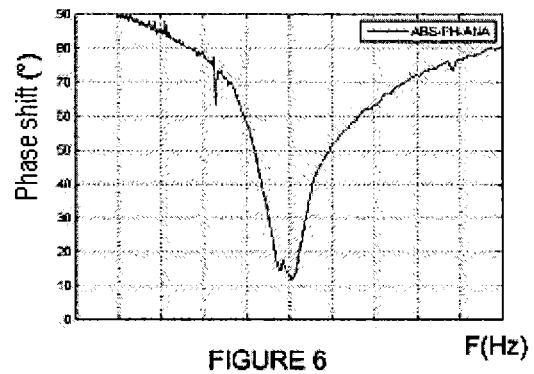
FIG. 6 illustrates the evolution of the phase shift signal as a function of the variable frequency.

As illustrated in FIG. 6, the phase difference between the voltage U and the current I in the charging circuit 10 is almost zero at resonance. The phase difference is negative before the resonant frequency, close to zero at resonance and positive beyond resonance (the phenomenon being reversed if the phase difference is established between the current I and the voltage U in the charging circuit). Thus, the absolute value of a signal corresponding to the phase difference between the voltage and the current in the charging circuit— termed the signal of absolute value—passes through an almost zero inflection point at resonance.

In the case illustrated in FIG. 6, which represents the absolute value of the phase shift as a function of frequency, the time derivative of the phase shift signal ABS_PH_ANA is therefore negative before the resonant frequency, and positive beyond. There is a correspondence between the sign of the phase difference and the sign of the derivative of the phase shift signal ABS_PH_ANA.

Figure 8:
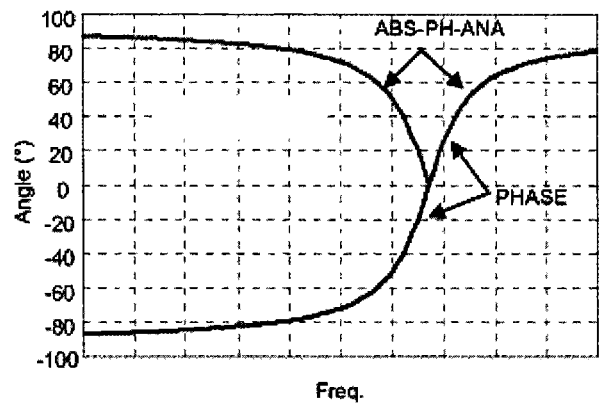
FIG. 8 illustrates the evolution of the phase shift signal and its absolute value as a function of the variable frequency.

FIG. 8 represents the real value—that is to say with the sign—of the phase shift as a function of frequency.

To drive the establishment of the frequency of the inverter 3, an analog processing is envisaged which makes it possible to provide the value of the phase shift ABS_PH_ANA, and a digital processing which makes it possible to provide an estimation of the sign of the phase difference, denoted PH_EST.

Figure 9:
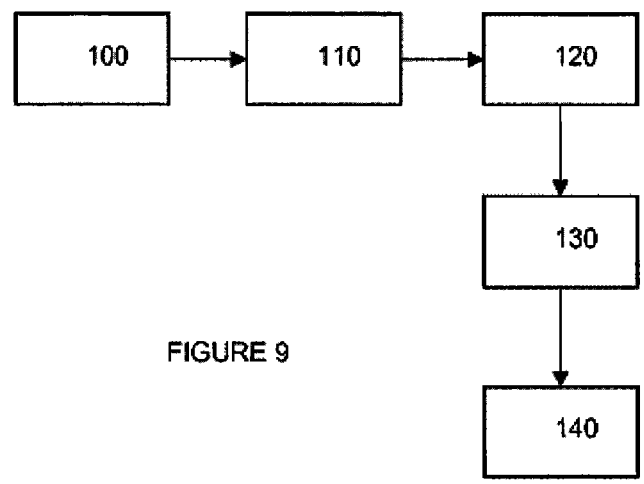
FIG. 9 illustrates an embodiment of the method according to the invention.

As represented in FIG. 9, at the analog level, the measurement 100 of the voltage U is compared with the measurement of the current I so as to compute 110 the value of the phase shift ABS_PH_ANA between these two quantities. For this purpose, a circuit 41 as illustrated in FIG. 3 can be implemented.

Figure 3:
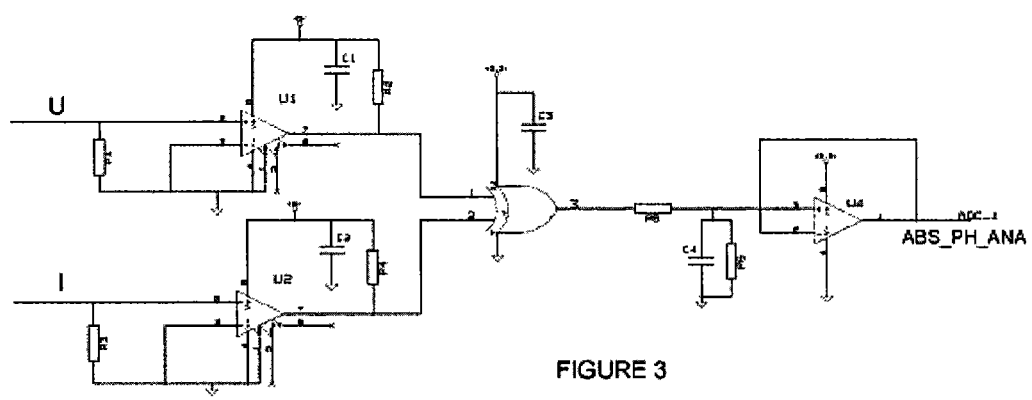
FIG. 3 illustrates an embodiment of a circuit for measuring the phase shift in absolute value between the voltage and the current.

In FIG. 3, U1 and U2 are comparators of the measurement of the voltage U (gating pulse signal) and the measurement of the intensity I (sinusoidal signal). Output from these comparators are positive gating pulse signals phase-shifted with respect to one another and input to an exclusive OR gate whose output is filtered, so as to recover the absolute value of the phase shift.

The (analog) phase shift signal ABS_PH_ANA is directed to an analog/digital converter at the input of a digital control board 42, so as to convert 120 the phase shift into a numerical value.

At the digital level, a digital processing makes it possible to slave 130 the variable frequency of the inverter to the value of the phase shift. For this purpose, the control board 42 comprises a computer, and optionally the analog/digital converter mentioned hereinabove.

A (boolean) initialization signal init is directed to another input of the computer. The value of the initialization signal init indicates the order to perform the power transfer or not. This makes it possible to command 140 the electrical power supply of the inverter 3 across the terminals of which is linked the emitting coil 11 according to a variable frequency, which is the image of N_PWM.

For this purpose, the computer comprises a regulator, in this instance a pulse width modulation PWM regulator, whose output signal N_PWM corresponds directly to the chopping period of the voltage inverter 3. The value of the signal N_PWM corresponds to a PWM register value and the chopping period T of the inverter 3 is related to the value of the signal N_PWM by the relation:

$$T = N\_PWM/10^8$$

This formula being related to the clock cycles of the control board 2 (with a clock frequency equal to 100 MHz).

Figure 4:
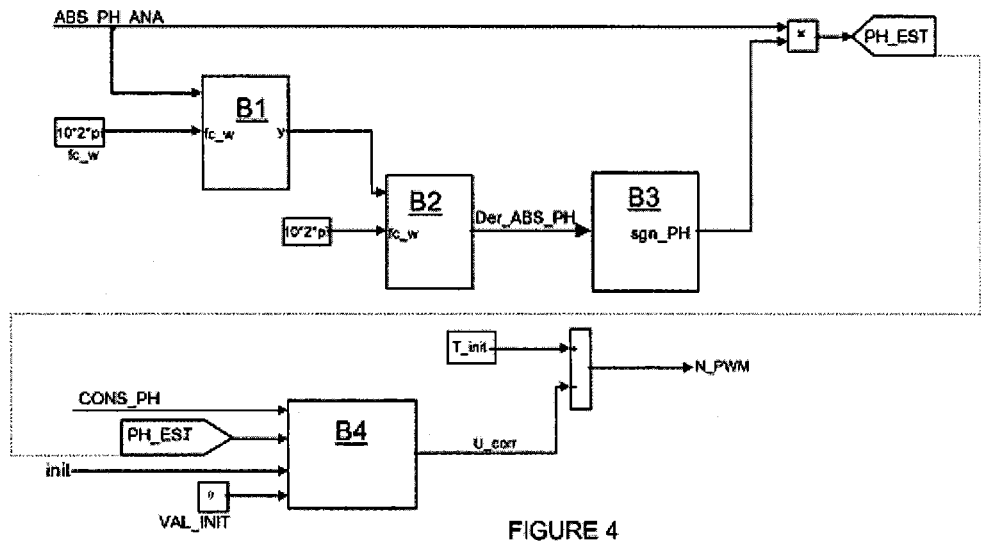
FIG. 4 illustrates an embodiment of a part of the computer (processor) according to the invention.

An embodiment of a part at least of the computer is illustrated in FIG. 4. It comprises four blocks B1 to B4.

The blocks B1, B2 and B3 make it possible to construct, on the basis of the analog phase shift ABS_PH_ANA, the signal PH_EST representative of the sign of the phase shift.

The block B1 is a filter which effects a filtering function, in this instance a low-pass filter of order 1. The adjustment parameter (cutoff angular frequency) is fc_w, a typical value of which is for example 628 rad/s. The function of the block B1 is to suppress the measurement noise arising from the analog signal ABS_PH_ANA.

The block B2 is a differentiator, in this instance a differentiator filter, which carries out a differentiation function. Preferably, it also effects another filter of order 1 whose adjustment parameter is fc_w, a typical value of which is for example also 628 rad/s. As output from the block B2 is generated a signal Der_ABS_PH, which is the image of the (filtered) derivative of the input signal ABS_PH_ANA.

Figure 5:
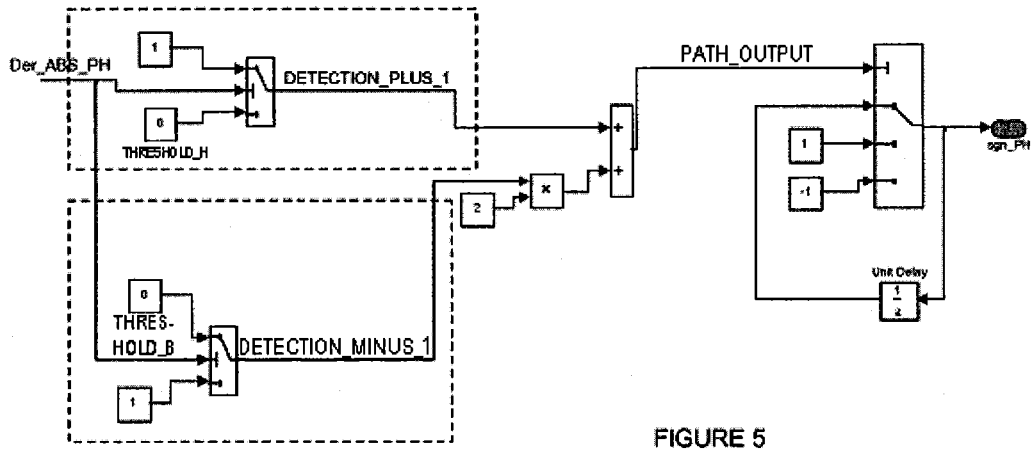
FIG. 5 illustrates an embodiment of the block B3 of FIG. 4.

The block B3 formulates the signal sgn_PH representative of the sign of the derivative Der_ABS_PH. An exemplary embodiment of the block 3 is illustrated in FIG. 5.

The signal Der_ABS_PH arising from the block B2 is compared with a first threshold value denoted Threshold_H: if the value of the derivative signal Der_ABS_PH is greater than this first threshold, then it is considered that the original signal (that is to say of the non-absolute-value phase shift signal) is positive and the passage to a positive value is detected; the signal DETECTION_PLUS_1 arising from the comparison equals 1.

The signal Der_ABS_PH arising from the block B2 is also compared with a second threshold value denoted Threshold_L: if the value of the derivative signal Der_ABS_PH is less than this second threshold, then it is considered that the original signal is negative and the passage to a negative value is detected; the signal DETECTION_MINUS_1 arising from the comparison equals 1.

Threshold_H and Threshold_L constitute two adjustable parameters. Typical values are 10 and −10 (one of the thresholds is positive, the other is negative); (too low a value for Threshold_B risks falsifying the detections, and too high a value for Threshold_H risks not detecting changes of sign).

The signal DETECTION_MINUS_1 is multiplied by a predetermined value, in this instance the value 2, the result of which is added to the signal DETECTION_PLUS_1 to form the signal PATH_OUTPUT according to the following logic:
  PATH_OUTPUT=0 if no detection of change of sign,
  PATH_OUTPUT=1 if DETECTION_PLUS_1=1,
  PATH_OUTPUT=2 if DETECTION_MINUS_1=1.

The output signal sgn_PH representative of the sign of the phase shift signal is thereafter easily constructed with the aid of a multiport switch for example according to the following logic:
  If PATH_OUTPUT=0 then the sign computed during the last call of the block is retained,
  PATH_OUTPUT=1, then sgn_PH=1,
  PATH_OUTPUT=2, then sgn_PH=−1.

The output signal sgn_PH can also be looped as input via a block 1/Z "unit delay" (FIG. 5) which makes it possible to recover the last value of the signal sgn_PH. In the case where no change has been detected, the previous value is then retained.

The output signal sgn_PH representative of the sign of the phase shift signal is multiplied with the phase shift signal ABS_PH_ANA to give the estimation signal PH_EST on one of the inputs of the block 4.

The block 4 effects closed-loop regulation; for example a conventional regulator of the P-I (Proportional Integral) type.

In one embodiment, the principle of the slaving is to start from a low initial frequency, determined by the initial value, which corresponds for example to a typical initial value T_init equal to 9000. This value is dimensionally equivalent to a time, to return to seconds it is divided by $10^8$ with a clock frequency equal to 100 MHz.

This initial value T_init is parametrizable.

Thus if the initial value equals 9000, the initial frequency of the inverter 3 then equals:

$$\text{Frequency} = 10^8/9000 = 11\,111\text{ Hz}.$$

When the regulator is activated, the command of the frequency of the inverter 3 is fixed by the value of the signal N_PWM according to the relation:

$$N\_PWM = T\_init - U\_Corr$$

U_Corr being the output of the P-I regulator (negative at the outset).

Thus the value of the signal N_PWM will decrease progressively and the frequency of the power supply will increase progressively until the desired resonance value.

The adjustment parameters (not represented in the figure) of the P-I corrector are:
the proportional gain Kp,
the integral gain Ki.

These two parameters make it possible to adjust the rate of convergence of the variable frequency to resonance.

The first input of the block B4 is a phase shift setpoint value CONS_PH that it is desired to achieve. On account of the various imperfections of the analog processing system making it possible to construct ABS_PH_ANA, the real phase shift signal never descends completely to zero, as indicated in FIG. 6. Therefore the setpoint cannot be fixed at 0 exactly. A typical value is 20° for example.

The second input corresponds to the quantity to be regulated, this being the reconstructed phase shift with its sign:

PH_ES=ABS_PH_ANA×sgn_PH

The third input corresponds to the signal init (boolean signal indicating an initialization state); when the signal equals 1 the signal signifies a standby state for which one does not seek to transfer power, and when the output of the PI controller is equal to the value fixed by the fourth input, therefore here a zero value.

When the signal init equals 0, the output of the PI controller will decrease progressively (since the initial value is of the order of) −90°; the corrector will thus progressively decrease N_PWM starting from the value fixed by T_init, until the desired value (the value close to resonance).

The fourth input corresponds to an initial value VAL_INITIAL in this instance fixed at 0. No setpoint is dispatched as long as the charging order has not been given, that is to say the signal "init" has not passed to 0.

Figure 7A:
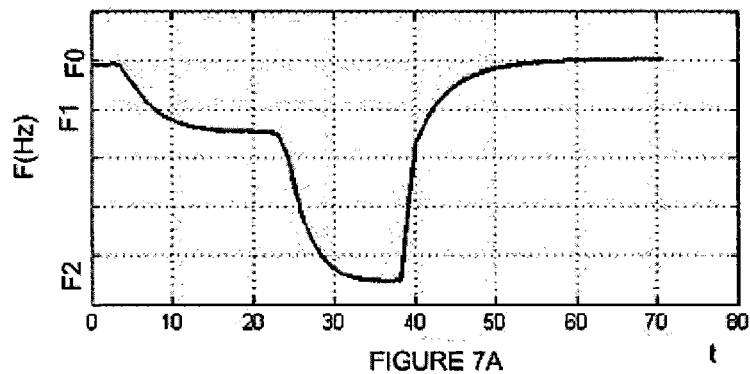
FIG. 7A and FIG. 7B illustrate in a synchronous manner respectively the evolution of the resonant frequency and the evolution of the phase shift signal (signed and unsigned in absolute value) as a function of time in case of relative movement between the primary and the secondary.
Figure 7B:
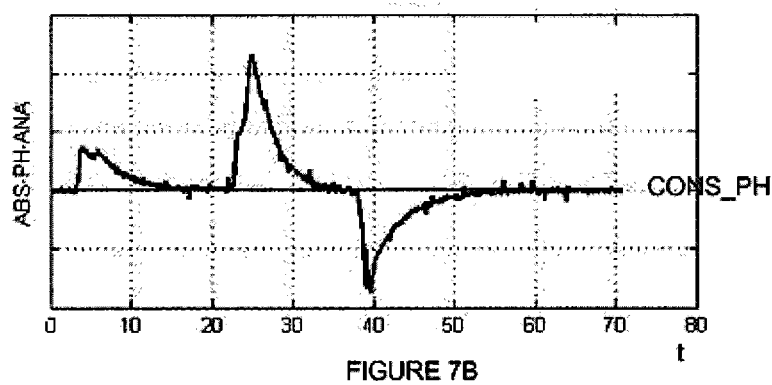

FIG. 7A and FIG. 7B illustrate in a synchronous manner respectively the evolution of the resonant frequency and the evolution of the phase shift signal as a function of time, during a trial in which the receiver (vehicle) and the charging undergo several relative movements, which creates disturbances in the power transfer.

The primary is initially right opposite the secondary; the slaving imposes an initial frequency F0 (in this instance about 21 kHz).

The secondary is firstly moved in one direction a first time. The frequency is decreased, progressively stabilized at a frequency F1 (in this instance about 20.5 kHz). This movement temporarily increases the phase shift (FIG. 7B), the latter thereafter stabilizing around its setpoint value CONS_PH.

The secondary is then moved in the same direction a second time. The frequency is again decreased, progressively stabilized at a frequency F2 (in this instance about 20 kHz). This movement again temporarily increases the phase shift (FIG. 7B), the latter thereafter stabilizing around its setpoint value CONS.

The secondary is then moved in the opposite direction to bring it back to the initial position. The slaving brings the frequency back to a value close to the initial value F0 and this movement temporarily decreases the phase shift (FIG. 7B), the latter thereafter stabilizing around its setpoint value CONS_PH.

Note that the slaving has been adjusted here fairly sluggishly, but that it is possible to significantly accelerate the speed of the slaving.

The invention claimed is:

1. A method of contactless charging of a battery of an electric automotive vehicle by magnetic induction between an emitting resonant circuit including an emitting coil of a charging device and a receiving resonant circuit of the vehicle including a receiving coil, the vehicle being positioned above the emitting coil for magnetic coupling between the emitting coil and the receiving coil, the method comprising:
commanding an electrical power supply together with setpoints of an inverter across terminals of which is linked the emitting coil in a variable frequency;
measuring in an analog circuit a value of a current and of a voltage across the terminals of the emitting coil;
computing, by using an analog circuit, a phase shift between the current and the voltage;
converting the phase shift into a numerical value; and
slaving a frequency of the setpoints dispatched to the inverter to the numerical value of the phase shift,
wherein the slaving is implemented by a proportional integral regulator, a value of a proportional gain of the proportional integral regulator and a value of an integral gain of the proportional integral regulator optimize a rate of convergence of the frequency of the inverter to the predetermined value.

2. The method as claimed in claim 1, further comprising:
establishing an absolute value of the phase shift;
computing a derivative of the absolute value of the phase shift;
computing a sign of the derivative; and
estimating a value of a real phase shift as a function of the absolute value of the phase shift, of the derivative, and of the sign of the derivative.

3. The method as claimed in claim 2, further comprising filtering the absolute value of the phase shift.

4. The method as claimed in claim 2, further comprising:
comparing the derivative of the absolute value of the phase shift with a high threshold value, and with a low threshold value;
emitting a signal representative of the sign of the signal of phase shift between the current and the voltage;
wherein
if the derivative of the absolute value of the phase shift is greater than the high threshold value, then the sign of the signal of phase shift between the current and the voltage is considered to be positive, and
if the derivative of the absolute value of the phase shift is less than the low threshold value, then the sign of the signal of phase shift between the current and the voltage is considered to be negative.

5. The method as claimed in claim 1, further comprising slaving the frequency of the inverter to a phase shift value below a predetermined value.

6. A non-transitory computer readable medium comprising computer program code instructions for execution of the method as claimed in claim 1, when the program code instructions are executed on a computer.

7. A system for contactless charging by magnetic induction of a battery of an electric automotive vehicle comprising a receiving resonant circuit which includes a receiving coil, the system comprising:
an emitting resonant circuit comprising an emitting coil;
an inverter across terminals of which is linked the emitting coil;
an analog and digital motherboard on which are disposed an analog circuit and a control board, a current and a voltage across the terminals of the emitting coil being measured and processed by the analog circuit that computes an absolute value of a phase shift between the current and the voltage, a phase shift signal arising from the analog circuit being injected as an input into the control board which emits as an output setpoints to the inverter; and an analog-digital converter for converting the phase shift into a numerical value, the control board being configured to slave a frequency of the setpoints dispatched to the inverter to a value of the phase shift, for magnetic coupling between the emitting coil and the receiving coil when the vehicle is positioned above the emitting coil, wherein the slaving is implemented by a proportional integral regulator, a value of a proportional gain of the proportional integral regulator and a value of an integral gain of the proportional integral regulator optimize a rate of convergence of the frequency of the inverter to the predetermined value.

\* \* \* \* \*